United States Patent [19]

Suzuki

[11] Patent Number: 5,490,014
[45] Date of Patent: Feb. 6, 1996

[54] HIGH-APERTURE-RATIO INNER-FOCUS TELEPHOTO LENS

[75] Inventor: Fumio Suzuki, Yokohama, Japan

[73] Assignee: Nikon Corporation, Tokyo, Japan

[21] Appl. No.: 167,210

[22] Filed: Dec. 16, 1993

[30] Foreign Application Priority Data

Dec. 28, 1992 [JP] Japan ..................... 4-348315

[51] Int. Cl.$^6$ .................................. G02B 13/02
[52] U.S. Cl. .................. 359/745; 359/746; 359/748; 359/557
[58] Field of Search ..................... 359/745, 746, 359/747, 748, 557

[56] References Cited

U.S. PATENT DOCUMENTS 4,610,514  4/1986  Nakamura ................ 359/745
5,323,270  6/1994  Sato ........................ 359/745
5,325,234  6/1994  Yoneyama ............... 359/745

FOREIGN PATENT DOCUMENTS 53-134425  11/1978  Japan.
59-116709   7/1984  Japan.
1-102413    4/1989  Japan.

Primary Examiner—Scott J. Sugarman
Attorney, Agent, or Firm—Shapiro and Shapiro

[57] ABSTRACT

A high-aperture-ratio inner-focus telephoto lens comprises a first lens group of positive refracting power, a second lens group of negative refracting power and a third lens group of positive refracting power arranged in the named order from the object side, in which the first lens group and the second lens group form a substantially afocal system, focusing is effected by moving the second lens group along the optical axis, and the first lens group has a front group of positive refracting power and a rear group of weak positive refracting power arranged in the named order from the object side.

13 Claims, 5 Drawing Sheets

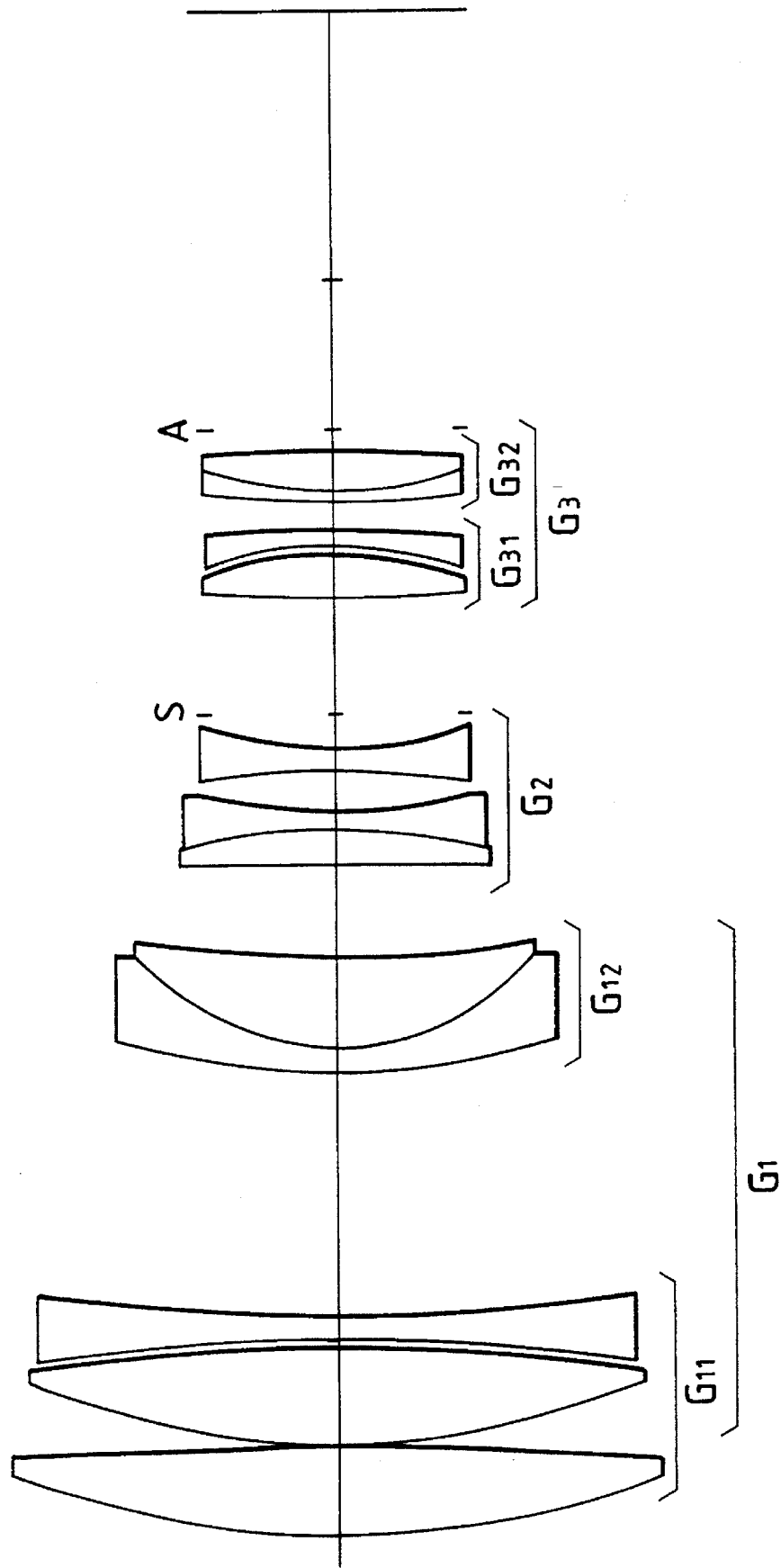

HIGH-APERTURE-RATIO INNER-FOCUS TELEPHOTO LENS

BACKGROUND OF THE INVENTION

1. Field of the Invention

The present invention relates to a high-aperture-ratio inner-focus telephoto lens used for example in single-lens reflex cameras and electronic still cameras, and more particularly to a high-aperture-ratio inner-focus telephoto lens having an angle of view equivalent to that of a lens with focal length of about 200 mm in case of 35 mm camera.

2. Related Background Art

A conventional high-aperture-ratio inner-focus telephoto lens is one having an angle of view equivalent to that of a lens with focal length of about 200 mm in case of 35 mm camera as disclosed for example in Japanese Laid-open Patent Application No. 53-134425, No. 59-116709 or No. 1-102413.

The lens as disclosed in Japanese Laid-open Patent Application No. 53-134425 has a big focusing lens group, which, in autofocus, forces a great load on a drive motor for the focusing group. Thus, the lens was disadvantageous in autofocus. Also, the lens as disclosed in Japanese Application No. 59-116709 has a focusing lens group composed of two groups which are moved at mutually different speeds, enabling compensation of aberration change in the near range. It had, however, drawbacks of complication and size increase of mechanism, because the focusing group was composed of the two groups. The lens as disclosed in Japanese Application No. 1-102413 has a nearest object distance of 2.5 m, which is relatively long among telephoto lenses having an angle of view equivalent to that of the lens with focal length of about 200 mm in case of 35 mm camera. Further, the imaging performance of the lens was not always satisfactory for shooting in the near range.

SUMMARY OF THE INVENTION

It is, therefore, an object of the present invention to provide a high-aperture-ratio inner-focus telephoto lens which is excellent in optical performance, simple in focusing mechanism, compact in size, and small in aberration change in shooting in the near range.

In an aspect of the present invention, achieving the above object, a high-aperture-ratio inner-focus telephoto lens comprises a first lens group $G_1$ of positive refracting power, a second lens group $G_2$ of negative refracting power and a third lens group $G_3$ of positive refracting power arranged in the named order from the object side, wherein said first lens group $G_1$ and said second lens group $G_2$ form a substantially afocal system, focusing is effected by moving said second lens group $G_2$ along the optical axis, and said first lens group $G_1$ has a front group $G_{11}$ of positive refracting power and a rear group $G_{12}$ of weak positive refracting power arranged in the named order from the object side.

In the above arrangement, the high-aperture-ratio inner-focus telephoto lens according to the present invention is composed of the three lens groups, which are positive, negative and positive in power, arranged in the named order from the object side. The first lens group $G_1$ of positive power and the second lens group $G_2$ of negative power are arranged such that the object focal point of second lens group $G_2$ is made coincident with the substantial image focal point of first lens group $G_1$.

Then, the second lens group $G_2$ is moved for focusing such that the object focal point of second lens group $G_2$ is always kept near the position of focal point of first lens group $G_1$.

Consequently, rays entering the third lens group $G_3$ are always kept substantially parallel to the optical axis, and the parallel rays form an image on a film plane through the third lens group $G_3$.

In the present invention, the refracting power of first lens group $G_1$ is constituted by a combination of the front group $G_{11}$ and the rear group $G_{12}$, which is advantageous in aberration compensation.

Such an arrangement can provide a high-aperture-ratio inner-focus telephoto lens which is excellent in optical performance, simple in focusing mechanism, compact in size, and small in aberration change in shooting in the near range.

The size of such photographic optical system can be decreased by shortening the focal length $f_1$ of first lens group $G_1$. Shortening the focal length $f_1$ of first lens group $G_1$ can decrease a gap between the first lens group $G_1$ and the second lens group $G_2$, which allows the size reduction of the total photographic optical system.

Also, by decreasing a movement amount of the second lens group $G_2$ which is the focusing group, a gap can be decreased between the second lens group $G_2$ and the third lens group $G_3$ while keeping the nearest object distance relatively short, which enables further size reduction of the total optical system.

Here, in order to keep small the movement amount of the second lens group $G_2$ as the focusing group, it is necessary to keep small for a movement amount of object point a movement amount of an image formed by the first lens group $G_1$ having the focal length $f_1$.

Considering the first lens group $G_1$ as thin lens, the following relation stands from the lens equation of image formation, where a is an object point distance and b is an image point distance.

$$1/a + 1/b = 1/f_1 \rightarrow f_1 = a/(a/b+1) \tag{A}$$

Letting $\alpha$ be a longitudinal magnification, the longitudinal magnification $\alpha$ can be expressed by the following equation.

$$\alpha = (-b/a)^2 = b^2/a^2 \rightarrow b = a\sqrt{\alpha} > 0 \tag{B}$$

It is seen from this equation that if the object point moves from an arbitrary position and the object point is again fixed relative to the first lens group $G_1$, that is, if the object point distance is set as a=constant, the movement amount of image point by the first lens group $G_1$ for the movement amount of object point can be reduced by making the longitudinal magnification $\alpha$ smaller.

Substituting Equation (B) into Equation (A), $$f_1 = a/(1/\sqrt{\alpha} + 1) \tag{C}$$

Then, decreasing the longitudinal magnification $\alpha$ also decreases the focal length $f_1$.

Thus, shortening the focal length $f_1$ of first lens group $G_1$ can decrease the movement amount of second lens group $G_2$ in focusing for a same near-range object. Also, the gap can be decreased between the second lens group $G_2$ and the third lens group $G_3$ and the gap can be also decreased between the first lens group $G_1$ and the second lens group $G_2$, whereby the total optical system can be constructed in reduced size.

However, if the first lens group $G_1$ has a too strong refracting power, the first lens group $G_1$ itself causes great spherical aberration, resulting in degrading the aberration of the total photographic optical system. Then, the following condition is preferably satisfied in order to obtain acceptable spherical aberration with less focusing movement amount.

$$0.60 < \phi/f_1 < 0.77 \tag{1}$$

The condition of Equation (1) defines a ratio between focal length $f_1$ of first lens group $G_1$ and effective aperture $\phi$ of an object-side lens surface of a positive lens element closest to the object in the first lens group. Above the upper limit of the condition of Equation (1), the focal length $f_1$ of the first lens group $G_1$ is too short relative to the effective aperture $\phi$, which would result in increasing the spherical aberration of the first lens group $G_1$ itself so as to be unable to be compensated. Further, the first lens group $G_1$ in the present invention is composed of the front group $G_{11}$ of positive refracting power and the rear group $G_{12}$ of weak positive refracting power arranged in the named order from the object side, but in the range above the upper limit the front group $G_{11}$ cannot be constructed of such a small number of lens elements as in embodiments of the present invention. In addition, the secondary chromatic spherical aberration also increases so as to be unable to be compensated.

Conversely, below the lower limit of the condition of Equation (1), the focal length of first lens Group $G_1$ becomes longer, which increases the focusing movement amount undesirably.

In the present invention, if the first lens group $G_1$ has a strong refracting power, the refracting power of the first lens group $G_1$ is properly assigned to the front group $G_{11}$ and the rear group $G_{12}$, so that the aberration compensation can be advantageously effected in the first lens group $G_1$. Also, the front group $G_{11}$ converges rays emergent from an object point on the optical axis (as will be referred to as Rand rays) to make them enter the rear Group $G_{12}$.

If the air gap is set smaller between the front group $G_{11}$ and the rear Group $G_{12}$ in such an arrangement, the Rand rays enter the rear Group $G_{12}$ at positions far from the optical axis, which is advantageous in compensation of spherical aberration in the rear Group $G_{12}$. However, if the air gap is set smaller between the front Group $G_{11}$ and the rear Group $G_{12}$, the outer diameter of rear Group $G_{12}$ increases, which is disadvantageous in size reduction and weight reduction of photographic optical system.

Then, the following condition of Equation (2) is preferably satisfied in order to compensate the spherical aberration satisfactorily while keeping small the outer diameter of rear group $G_{12}$ in the first lens group $G_1$.

$$0.10 < D_1/Bf_{11} < 0.26 \tag{2}$$

The condition of Equation (2) defines the air gap $D_1$ between the front group $G_{11}$ and the rear group $G_{12}$ with respect to back focus $Bf_{11}$ of front group $G_{11}$ in the first lens group $G_1$.

Above the upper limit of the condition of Equation (2), the air gap $D_1$ increases between the front group $G_{11}$ and the rear group $G_{12}$, so that the Rand rays enter the rear group $G_{12}$ at positions near the optical axis, which undesirably makes difficult the compensation of spherical aberration in the rear group $G_{12}$.

Conversely, below the lower limit of the condition of Equation (2), the air gap $D_1$ decreases between the front group $G_{11}$ and the rear group $G_{12}$, so that the Rand rays enter the rear group $G_{12}$ at positions too far from the optical axis, which results in increasing the outer diameter of the rear group $G_{12}$ unpreferably.

Specifically speaking of the rear group $G_{12}$ in the first lens group, the rear group $G_{12}$ is preferably composed of a negative meniscus lens with a convex surface on the object side and a positive meniscus lens with a convex surface on the object side arranged in the named order from the object side in order to obtain better imaging performance. Since the rear group $G_{12}$ is a lens group for auxiliarily compensating the spherical aberration, it is preferably arranged in the meniscus form with a convex surface on the object side to avoid influence on rays except for the Rand rays.

Although the rear group $G_{12}$ will be described as a lens group of bonded elements for simplicity of lens barrel structure in each embodiment as will be described, it may be constructed as a lens group of two separate lens elements in order to increase the degree of freedom in aberration compensation.

In the present invention, the first lens group $G_1$ and the second lens group $G_2$ form a substantially afocal system, so that the third lens group $G_3$ has brightness equivalent to that of the total optical system. Therefore, as the optical system increases its aperture as in the present invention, the load increases on the aberration compensation in the third lens group $G_3$ in such arrangement. Then, the third lens group $G_3$ is preferably constructed as follows in order to reduce the size of the third lens group $G_3$ and to improve the performance in aberration compensation.

The third lens group $G_3$ has a front group $G_{31}$ of weak positive refracting power and a rear group $G_{32}$ of positive refracting power. The front group $G_{31}$ is composed at least of a positive lens and a negative lens. The front group $G_{31}$ is effective to compensate the chromatic aberration and the spherical aberration, and the rear group $G_{32}$ has a stronger refracting power than that of the front group $G_{31}$ to attain most of the refracting power of the third lens group $G_3$. The arrangement of refracting power between the front group $G_{31}$ and the rear group $G_{32}$ is preferably set within the range defined by the following condition to effect proper aberration compensation.

$$0.10 < f_3/f_{31} < 0.35 \tag{3}$$

The condition of Equation (3) defines a ratio of focal length $f_3$ of third lens group $G_3$ to focal length $f_{31}$ of front group $G_{31}$ in the third lens group $G_3$. Above the upper limit of the condition of Equation (3), the front group $G_{31}$ in the third lens group $G_3$ has a stronger refracting power, so that a load increases on the compensation of spherical aberration in the front group $G_{31}$. Thus, the compensation of spherical aberration could be insufficient. Further, it is unpreferable in respect of increase in change of upper coma with a change in object distance from infinity shooting to near range Shooting. Conversely, below the lower limit of the condition of Equation (3), the rear group $G_{32}$ in the third lens group $G_3$ has a too strong refracting power, which makes difficult the compensation of spherical aberration and coma by the front group $G_{31}$.

In such arrangement, the rear group $G_{32}$ in the third lens group preferably satisfies the following condition of Equation (4).

$$-0.17 < q_{32} < 0.35 \tag{4}$$

where $q_{32}$ is a dimensional factor of the rear group $G_{32}$ in the third lens group $G_3$ and $q_{32} = (R_2 + R_1)/(R_2 - R_1)$ where $R_1$: a radius of curvature of a surface closest to an object in the rear group $G_{32}$ in the third lens group $G_3$;

$R_2$: a radius of curvature of a surface closest to an image in the rear group $G_{32}$ in the third lens group $G_3$.

The condition of Equation (4) is for minimizing the spherical aberration caused by the rear group $G_{32}$ in the third lens group under the above condition of Equation (3). If the condition of Equation (4) is not satisfied, the load increases on the compensation of spherical aberration in the front group $G_{31}$ in the third lens group, which undesirably makes the compensation of spherical aberration difficult.

Further, the following condition is more preferably satisfied.

$$-0.47 < f_2/f_1 < -0.37 \tag{5}$$

The condition of Equation (5) is a condition for well compensating the aberration of off-axial rays by defining a ratio of focal length $f_2$ of the second lens group $G_2$ to focal length $f_1$ of the first lens group $G_1$.

Above the upper limit of the condition of Equation (5), the gap increases between the first lens group $G_1$ and the second lens group $G_2$, so that the off-axial rays enter the second lens group $G_2$ at positions near the optical axis. This undesirably makes it difficult for the second lens group $G_2$ to compensate the astigmatism caused by the first lens group $G_1$. Conversely, below the lower limit of the condition of Equation (5), the gap decreases between the first lens group $G_1$ and the second lens group $G_2$, so that the Rand rays enter the second lens group $G_2$ at positions far from the optical axis. This increases the outer diameter of the second lens group $G_2$ as the focusing group. Then, the load unpreferably increases on the drive motor for focusing group in autofocus.

BRIEF DESCRIPTION OF THE DRAWINGS

FIG. 5 is a drawing to show a lens arrangement in Embodiment 5 according to the present invention.

DESCRIPTION OF THE PREFERRED EMBODIMENTS

Embodiments according to the present invention will be next described in detail with reference to the accompanying drawings.

FIG. 1 to FIG. 5 are drawings respectively to show a lens arrangement in each of Embodiments 1-5 according to the present invention. In each embodiment as shown in FIG. 1 to FIG. 5, the lens is constituted by a first lens group $G_1$ of positive refracting power, a second lens group $G_2$ of negative refracting power and a third lens group $G_3$ of positive refracting power arranged in the named order from the object side, in which the first lens group $G_1$ and the second lens group $G_2$ form a substantially afocal system and, in focusing from the infinity to a near range object, the second lens group $G_2$ moves toward the image.

In each embodiment, an aperture stop S is disposed between the second lens group $G_2$ and the third lens group $G_3$.

Embodiment 1

Figure 1:
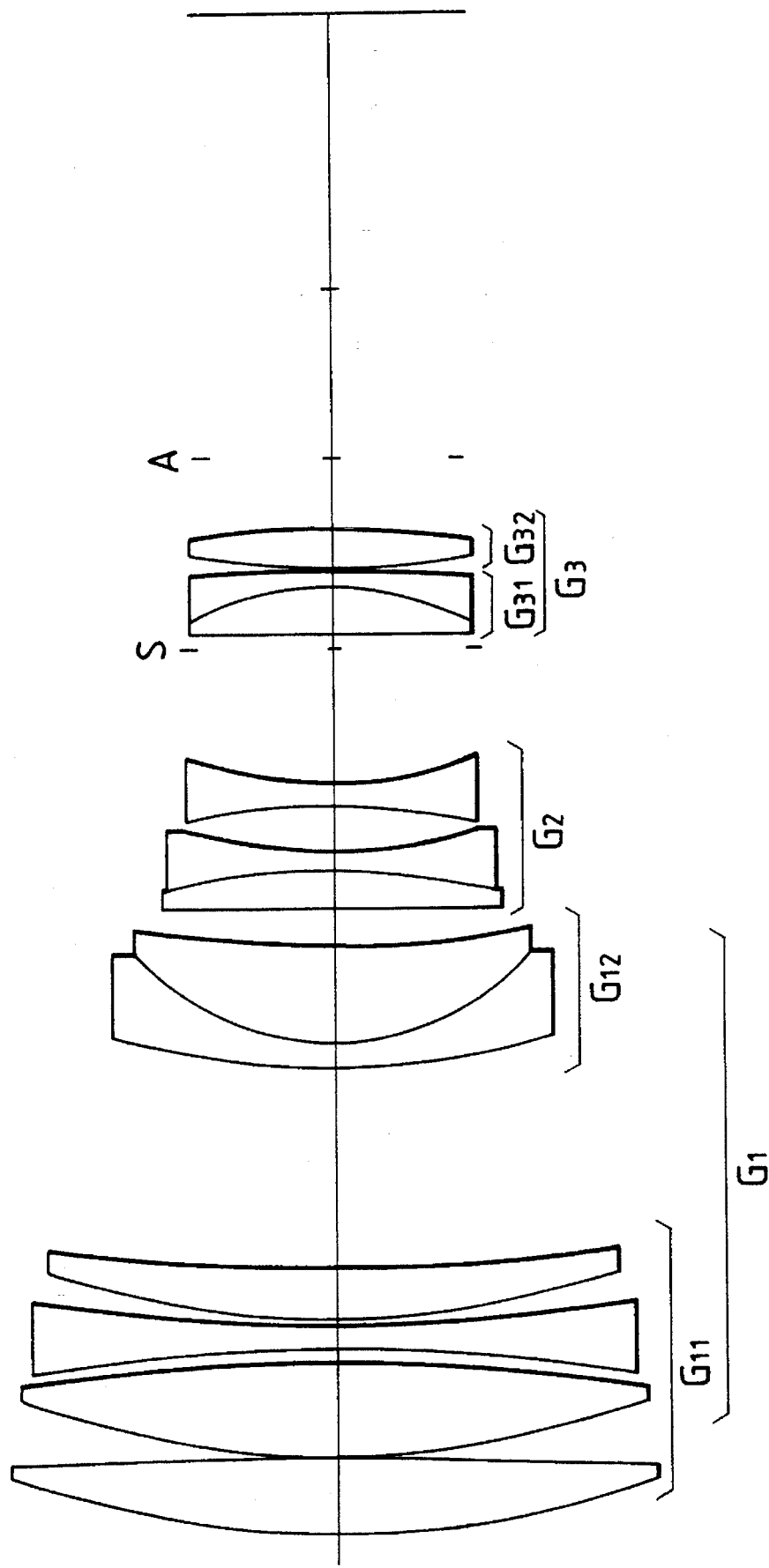
FIG. 1 is a drawing to show a lens arrangement in Embodiment 1 according to the present invention.

FIG. 1 is a drawing to show a lens arrangement in Embodiment 1 according to the present invention. As shown in FIG. 1, Embodiment 1 of telephoto lens is constructed in the following order from the object side, of a first lens group $G_1$ composed of a front group $G_{11}$ including two positive double convex lenses, a negative double concave lens, and a positive meniscus lens with a convex surface on the object side, and a rear Group $G_{12}$ which is a compound lens of a negative meniscus lens with a convex surface on the object side and a positive meniscus lens with a convex surface on the object side; a second lens Group $G_2$ composed of a compound lens of a positive meniscus lens with a concave surface on the object side and a negative double concave lens, and a negative double concave lens; an aperture stop S; a third lens Group $G_3$ composed of a front Group $G_{31}$ which is a compound lens of a positive double convex lens with a stronger convex surface on the image side and a negative meniscus lens with a convex surface on the image side, and a rear Group $G_{32}$ of a positive double convex lens; and a stationary stop A.

The following table lists specifications in Embodiment 1 of the present invention. In the table of specifications in each embodiment, each number in the left end column represents an order counted from the object side, r a radius of curvature of lens surface, d a distance between lens surfaces, n and ν an index of refraction and an Abbe's number for d line ($\lambda=587.6$ nm), respectively, f a focal length, $F_{no}$ an f-number, $\beta$ an image magnification, and D0 a distance between an object and the first lens surface.

TABLE 1

(Specifications for Embodiment 1)

$f = 195.00$ mm
$F_{no} = 2$

| r | d | ν | n |
|---|---|---|---|
| 1  148.750 | 11.50 | 82.6 | 1.49782 |
| 2 −1205.785 | 0.30 | | |
| 3  142.017 | 14.50 | 82.6 | 1.49782 |
| 4 −320.577 | 2.00 | | |
| 5 −307.636 | 3.70 | 35.2 | 1.74950 |
| 6  280.469 | 1.00 | | |
| 7  136.923 | 8.00 | 82.6 | 1.49782 |
| 8  348.636 | 30.90 | | |
| 9  121.116 | 3.90 | 60.0 | 1.64000 |
| 10   41.001 | 15.00 | 67.9 | 1.59319 |
| 11  178.431 | (d11) | | |
| 12 −1353.905 | 6.00 | 23.8 | 1.84666 |
| 13 −105.258 | 3.00 | 64.1 | 1.51680 |
| 14   76.392 | 7.10 | | |
| 15 −104.451 | 3.50 | 65.7 | 1.46450 |
| 16   61.871 | (d16) | | |
| 17 1692.861 | 7.50 | 53.7 | 1.69350 |
| 18  −47.031 | 2.50 | 28.2 | 1.74000 |
| 19 −306.591 | 0.30 | | |
| 20  129.809 | 6.00 | 49.4 | 1.77279 |
| 21 −165.858 | 11.00 | | |
| 22   ∞ | (Bf) | | |

$f = 195.0000 \quad \beta = -0.1201$
D0  ∞   1765.5380
d11  5.9982   18.7714
d16  22.7762   10.0030
Bf  67.9864   67.9864

There are listed in the following for Embodiment 1 a focal length of each lens group, an effective aperture $\phi$ of object-side lens surface of the positive lens element closest to the object in the first lens group $G_1$, a back focus $Bf_{11}$ of the front group $G_{11}$ in the first lens group $G_1$, and an air gap $D_1$ between the front group $G_{31}$ and the rear group $G_{32}$ in the third lens group.

$f_1 = 144.000$
$f_2 = -60.000$
$f_3 = 81.250$ $f_{31}$=545.252

$\phi$=97.500

$Bf_{11}$=137.408

$D_1$=30.901

Next listed are values for the aforementioned conditions in Embodiment 1.

(1) $\phi/f_1$=0.677

(2) $D_1/Bf_{11}$=0.225

(3) $f_3/f_{31}$=0.149

(4) $q_{32}$=0.122

(5) $f_2/f_1$=−0.417

Embodiment 2

Figure 2:
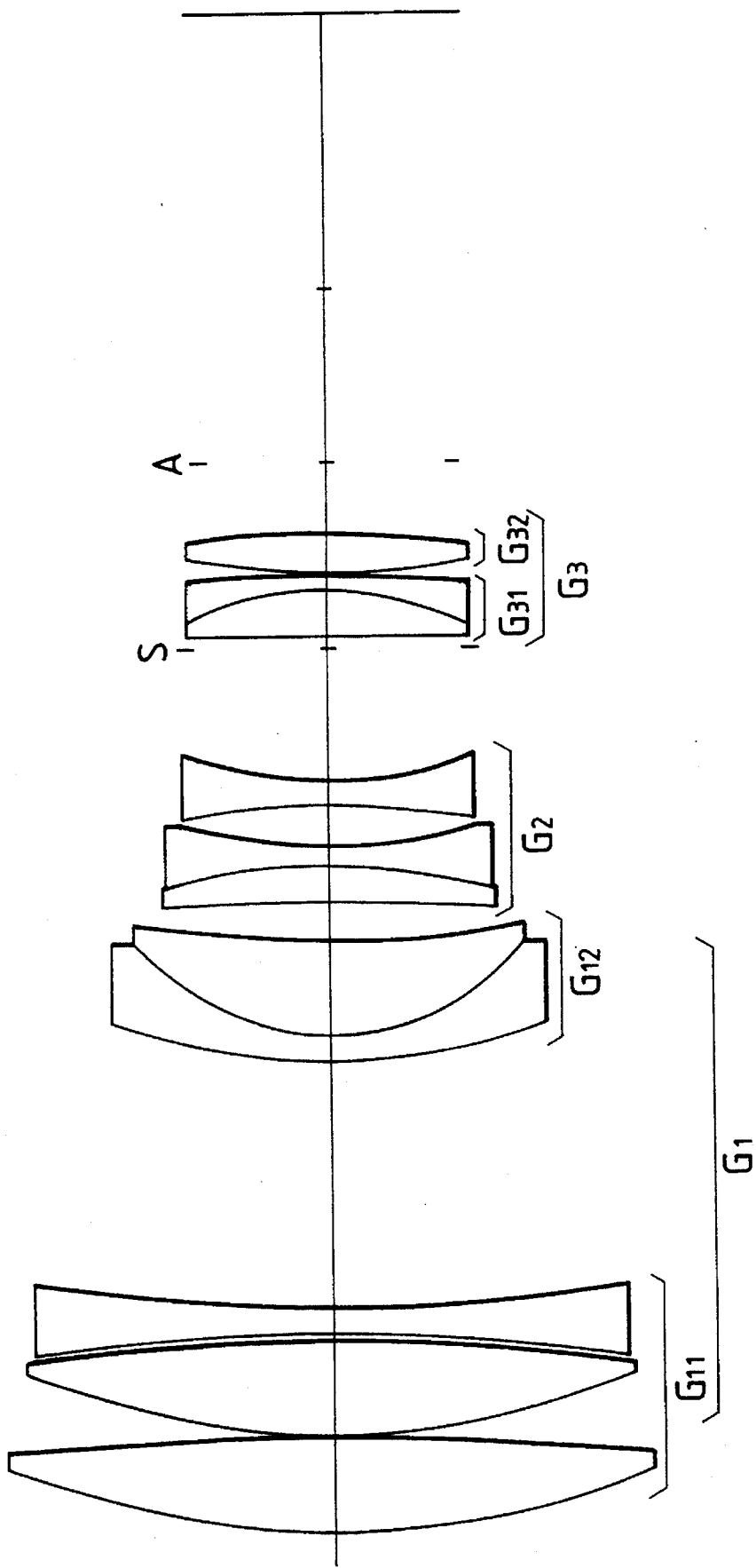
FIG. 2 is a drawing to show a lens arrangement in Embodiment 2 according to the present invention.

FIG. 2 is a drawing to show a lens arrangement in Embodiment 2 according to the present invention. As shown in FIG. 2, Embodiment 2 of telephoto lens is constructed in the following order from the object side, of a first lens group $G_1$ composed of a front group $G_{11}$ including two positive double convex lenses and a negative double concave lens, and a rear group $G_{12}$ which is a compound lens of a negative meniscus lens with a convex surface on the object side and a positive meniscus lens with a convex surface on the object side; a second lens group $G_2$ composed of a compound lens of a positive meniscus lens with a concave surface on the object side and a negative double concave lens, and a negative double concave lens; an aperture stop S; a third lens group $G_3$ composed of a front group $G_{31}$ which is a compound lens of a positive meniscus lens with a convex surface on the image side and a negative meniscus lens with a convex surface on the image side, and a rear group $G_{32}$ of a positive double convex lens; and a stationary stop A.

The following table lists specifications in Embodiment 2 of the present invention. In the table of specifications in each embodiment, each number in the left end column represents an order counted from the object side, r a radius of curvature of lens surface, d a distance between lens surfaces, n and v an index of refraction and an Abbe's number for d line (λ=587.6 nm), respectively, f a focal length, $F_{no}$ an f-number, β an image magnification, and D0 a distance between an object and the first lens surface.

TABLE 2

(Specifications for Embodiment 2)

f = 195.00 mm
$F_{no}$ = 2

| | r | d | v | n |
|---|---|---|---|---|
| 1 | 128.016 | 15.00 | 82.6 | 1.49782 |
| 2 | −566.110 | 0.30 | | |
| 3 | 122.059 | 14.50 | 82.6 | 1.49782 |
| 4 | −331.164 | 1.00 | | |
| 5 | −306.978 | 3.70 | 35.2 | 1.74950 |
| 6 | 261.822 | 38.33 | | |
| 7 | 96.244 | 3.90 | 60.0 | 1.64000 |
| 8 | 38.562 | 15.00 | 67.9 | 1.59319 |
| 9 | 159.310 | (d9) | | |
| 10 | −563.672 | 6.00 | 23.8 | 1.84666 |
| 11 | −93.627 | 3.00 | 64.1 | 1.51680 |
| 12 | 84.852 | 6.40 | | |
| 13 | −110.869 | 3.50 | 65.7 | 1.46450 |
| 14 | 58.532 | (d14) | | |
| 15 | −6430.227 | 7.50 | 53.7 | 1.69350 |
| 16 | −45.538 | 2.50 | 28.2 | 1.74000 |
| 17 | −288.190 | 0.30 | | |
| 18 | 123.848 | 6.00 | 49.4 | 1.77279 |
| 19 | −163.413 | 11.00 | | |
| 20 | ∞ | (Bf) | | |

TABLE 2-continued (Specifications for Embodiment 2)

f = 195.00 mm
$F_{no}$ = 2

| | r | d | v | n |
|---|---|---|---|---|
| | f =195.0000 | β =−0.1198 | | |
| D0 | ∞ | 1765.2004 | | |
| d9 | 5.9970 | 18.7416 | | |
| d14 | 22.6002 | 9.8556 | | |
| Bf | 68.2697 | 67.2697 | | |

There are listed in the following for Embodiment 2 a focal length of each lens group, an effective aperture $\phi$ of object-side lens surface of the positive lens element closest to the object in the first lens group $G_1$, a back focus $Bf_{11}$ of the front group $G_{11}$ in the first lens group $G_1$, and an air gap $D_1$ between the front group $G_{31}$ and the rear group $G_{32}$ in the third lens group.

$f_1$=144.000

$f_2$=−60.000

$f_3$=81.250

$f_{31}$=692.673

$\phi$=97.500

$Bf_{11}$=156.742

$D_1$=38.333

Next listed are values for the aforementioned conditions in Embodiment 2.

(1) $\phi/f_1$=0.677

(2) $D_1/Bf_{11}$=0.245

(3) $f_3/f_{31}$=0.117

(4) $q_{32}$=0.138

(5) $f_2/f_1$=−0.417

Embodiment 3

Figure 3:
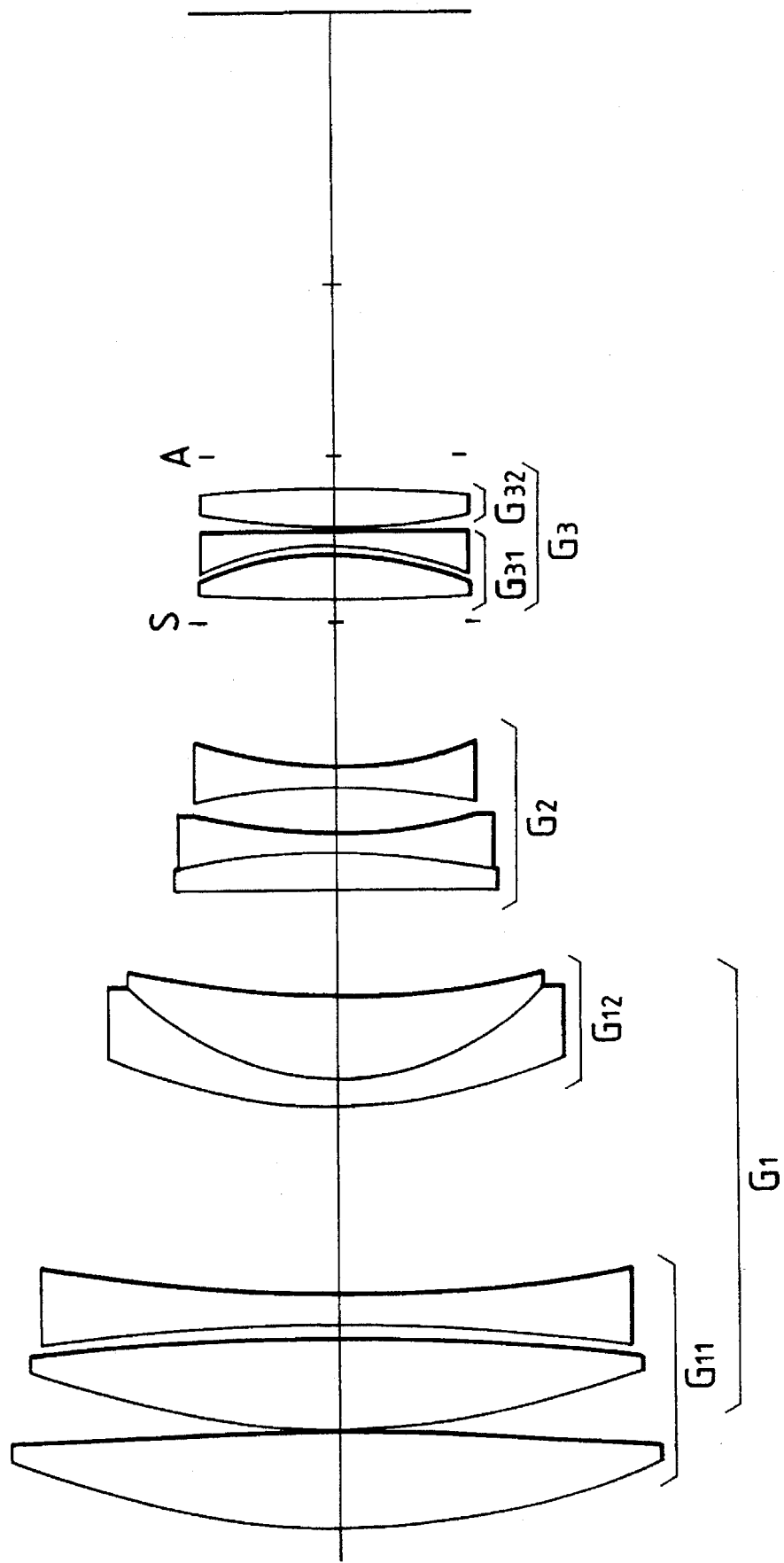
FIG. 3 is a drawing to show a lens arrangement in Embodiment 3 according to the present invention.

FIG. 3 is a drawing to show a lens arrangement in Embodiment 3 according to the present invention. As shown in FIG. 3, Embodiment 3 of telephoto lens is constructed in the following order from the object side, of a first lens group $G_1$ composed of a front group $G_{11}$ including two positive double convex lenses and a negative double concave lens, and a rear group $G_{12}$ which is a compound lens of a negative meniscus lens with a convex surface on the object side and a positive meniscus lens with a convex surface on the object side; a second lens group $G_2$ composed of a compound lens of a positive meniscus lens with a concave surface on the object side and a negative double concave lens, and a negative double concave lens; an aperture stop S; a third lens group $G_3$ composed of a front group $G_{31}$ composed of a positive double convex lens with a stronger convex surface on the image side and a negative meniscus lens with a convex surface on the image side, and a rear group $G_{32}$ of a positive double convex lens; and a stationary stop A.

The following table lists specifications in Embodiment 3 of the present invention. In the table of specifications in each embodiment, each number in the left end column represents an order counted from the object side, r a radius of curvature of lens surface, d a distance between lens surfaces, n and v an index of refraction and an Abbe's number for d line (λ=587.6 nm), respectively, f a focal length, $F_{no}$ an f-number, β an image magnification, and D0 a distance between an object and the first lens surface.

TABLE 3

(Specifications for Embodiment 3)

f = 195.00 mm
$F_{no} = 2$

| | r | d | ν | n |
|---|---|---|---|---|
| 1 | 122.647 | 15.00 | 82.6 | 1.49782 |
| 2 | -677.504 | 0.50 | | |
| 3 | 127.484 | 14.00 | 82.6 | 1.49782 |
| 4 | -426.939 | 2.00 | | |
| 5 | -353.235 | 5.00 | 35.2 | 1.74950 |
| 6 | 257.054 | 29.10 | | |
| 7 | 87.534 | 4.00 | 55.6 | 1.69680 |
| 8 | 42.733 | 13.00 | 67.9 | 1.59319 |
| 9 | 135.210 | (d9) | | |
| 10 | -866.539 | 6.00 | 23.8 | 1.84666 |
| 11 | -108.725 | 3.00 | 64.1 | 1.51680 |
| 12 | 80.309 | 7.10 | | |
| 13 | -114.889 | 3.50 | 65.7 | 1.46450 |
| 14 | 62.031 | (d14) | | |
| 15 | 289.420 | 7.20 | 53.7 | 1.69350 |
| 16 | -54.834 | 1.20 | | |
| 17 | -53.390 | 2.40 | 27.6 | 1.74077 |
| 18 | -545.430 | 0.50 | | |
| 19 | 119.482 | 6.00 | 49.4 | 1.77279 |
| 20 | -190.308 | 5.00 | | |
| 21 | ∞ | (Bf) | | |

| f = 195.0000 | β = -0.1211 |
|---|---|
| D0  ∞ | 1764.9781 |
| d9  16.5418 | 30.9892 |
| d14  25.8092 | 11.3618 |
| Bf  68.1697 | 68.1697 |

There are listed in the following for Embodiment 3 a focal length of each lens group, an effective aperture φ of object-side lens surface of the positive lens element closest to the object in the first lens group $G_1$, a back focus $Bf_{11}$ of the front group $G_{11}$ in the first lens group $G_1$, and an air gap $D_1$ between the front group $G_{31}$ and the rear group $G_{32}$ in the third lens group.

$f_1 = 152.500$ $f_2 = -61.000$ $f_3 = 78.000$ $f_{31} = 364.073$ $φ = 97.500$ $Bf_{11} = 158.546$ $D_1 = 29.099$

Next listed are values for the aforementioned conditions in Embodiment 3.

(1) $φ/f_1 = 0.639$ (2) $D_1/Bf_{11} = 0.184$ (3) $f_3/f_{31} = 0.214$ (4) $q_{32} = 0.229$ (5) $f_2/f_1 = -0.400$

Embodiment 4

Figure 4:
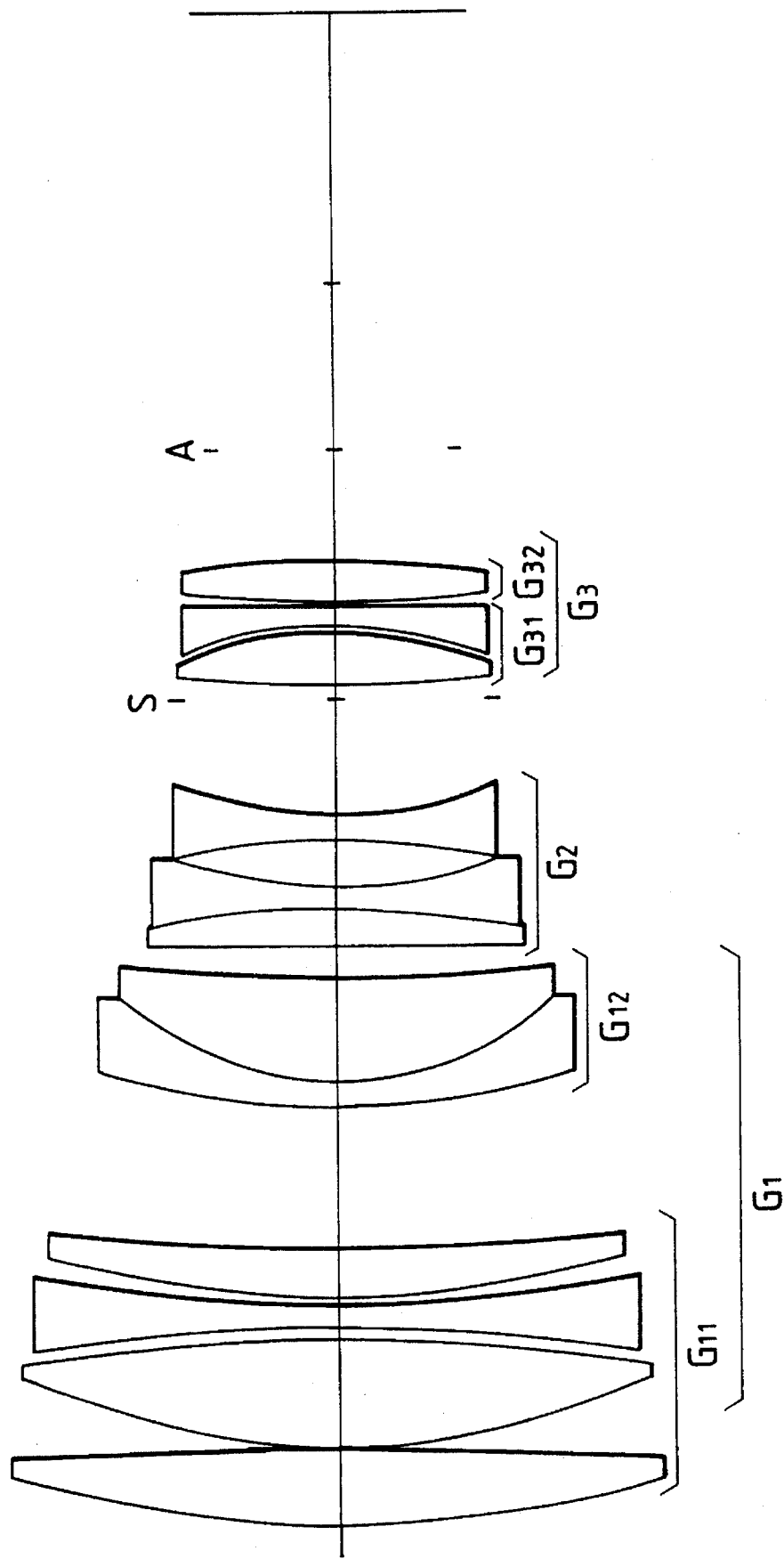
FIG. 4 is a drawing to show a lens arrangement in Embodiment 4 according to the present invention.

FIG. 4 is a drawing to show a lens arrangement in Embodiment 4 according to the present invention. As shown in FIG. 4, Embodiment 4 of telephoto lens is constructed in the following order from the object side, of a first lens group $G_1$ composed of a front group $G_{11}$ including two positive double convex lenses, a negative double concave lens, and a positive meniscus lens with a convex surface on the object side, and a rear group $G_{12}$ which is a compound lens of a negative meniscus lens with a convex surface on the object side and a positive meniscus lens with a convex surface on the object side; a second lens group $G_2$ composed of a compound lens of a positive meniscus lens with a concave surface on the object side and a negative double concave lens, and a negative double concave lens; an aperture stop S; a third lens group $G_3$ composed of a front group $G_{31}$ composed of a positive double convex lens with a stronger convex surface on the image side and a negative meniscus lens with a convex surface on the image side, and a rear group $G_{32}$ of a positive double convex lens; and a stationary stop A.

The following table lists specifications in Embodiment 4 of the present invention. In the table of specifications in each embodiment, each number in the left end column represents an order counted from the object side, r a radius of curvature of lens surface, d a distance between lens surfaces, n and ν an index of refraction and an Abbe's number for d line (λ=587.6 nm), respectively, f a focal length, $F_{no}$ an f-number, β an image magnification, and D0 a distance between an object and the first lens surface.

TABLE 4

(Specifications for Embodiment 4)

f = 198.00 mm
$F_{no} = 2$

| | r | d | ν | n |
|---|---|---|---|---|
| 1 | 176.600 | 12.00 | 82.5 | 1.49782 |
| 2 | -980.896 | 0.30 | | |
| 3 | 117.075 | 17.00 | 82.5 | 1.49782 |
| 4 | -291.364 | 1.80 | | |
| 5 | -284.799 | 3.50 | 35.2 | 1.74950 |
| 6 | 240.757 | 1.00 | | |
| 7 | 157.380 | 8.00 | 82.5 | 1.49782 |
| 8 | 451.625 | 22.14 | | |
| 9 | 127.025 | 4.00 | 60.0 | 1.64000 |
| 10 | 50.405 | 16.00 | 67.9 | 1.59319 |
| 11 | 296.235 | (d11) | | |
| 12 | 20000.000 | 6.00 | 23.0 | 1.86074 |
| 13 | -137.877 | 3.00 | 70.4 | 1.48749 |
| 14 | 68.971 | 8.00 | | |
| 15 | -102.684 | 3.50 | 65.8 | 1.46450 |
| 16 | 65.522 | (d16) | | |
| 17 | 244.766 | 8.50 | 53.7 | 1.69350 |
| 18 | -60.716 | 1.00 | | |
| 19 | -60.242 | 3.00 | 28.3 | 1.72825 |
| 20 | 7493.004 | 0.50 | | |
| 21 | 200.911 | 6.50 | 49.5 | 1.77279 |
| 22 | -147.244 | 17.00 | | |
| 23 | ∞ | (Bf) | | |

| f = 198.0000 | β = -0.1207 |
|---|---|
| D0  ∞ | 1763.7176 |
| d11  4.9176 | 15.7144 |
| d16  20.6778 | 9.8810 |
| Bf  67.9434 | 67.9434 |

There are listed in the following for Embodiment 4 a focal length of each lens group, an effective aperture φ of object-side lens surface of the positive lens element closest to the object in the first lens Group $G_1$, a back focus $Bf_{11}$ of the front Group $G_{11}$ in the first lens Group $G_1$, and an air gap $D_1$ between the front Group $G_{31}$ and the rear Group $G_{32}$ in the third lens Group.

$f_1 = 133.100$ $f_2 = -60.500$ $f_3 = 90.000$ $f_{31} = 409.757$ $φ = 99.000$ $Bf_{11} = 141.509$ $D_1 = 22.144$

Next listed are values for the aforementioned conditions in Embodiment 4.

(1) $φ/f_1 = 0.744$ (2) $D_1/Bf_{11}=0.157$
(3) $f_3/f_{31}=0.220$
(4) $q_{32}=-0.154$
(5) $f_2/f_1=-0.455$

Embodiment 5

FIG. 5 is a drawing to show a lens arrangement in Embodiment 5 according to the present invention. As shown in FIG. 5, Embodiment 5 of telephoto lens is constructed in the following order from the object side, of a first lens Group $G_1$ composed of a front Group $G_{11}$ including two positive double convex lenses and a negative double concave lens, and a rear Group $G_{12}$ which is a compound lens of a negative meniscus lens with a convex surface on the object side and a positive meniscus lens with a convex surface on the object side; a second lens group $G_2$ composed of a compound lens of a positive meniscus lens with a concave surface on the object side and a negative double concave lens, and a negative double concave lens; an aperture stop S; a third lens group $G_3$ composed of a front group $G_{31}$ composed of a positive double convex lens with a stronger convex surface on the image side and a negative meniscus lens with a convex surface on the image side, and a rear group $G_{32}$ which is a compound lens of a negative meniscus lens with a convex surface on the object side and a positive double convex lens; and a stationary stop A.

The following table lists specifications in Embodiment 5 of the present invention. In the table of specifications in each embodiment, each number in the left end column represents an order counted from the object side, r a radius of curvature of lens surface, d a distance between lens surfaces, n and ν an index of refraction and an Abbe's number for d line (λ=587.6 nm), respectively, f a focal length, $F_{no}$ an f-number, β an image magnification, and D0 a distance between an object and the first lens surface.

TABLE 5

(Specifications for Embodiment 5)

f = 195.00 mm
$F_{no}$ = 2

| r | d | Abbe | n |
|---|---|------|---|
| 1 135.402 | 14.00 | 82.5 | 1.49782 |
| 2 758.266 | 0.30 | | |
| 3 120.706 | 15.00 | 82.5 | 1.49782 |
| 4 332.284 | 1.30 | | |
| 5 315.793 | 3.80 | 35.2 | 1.74950 |
| 6 314.945 | 37.732 | | |
| 7 119.204 | 3.80 | 60.0 | 1.64000 |
| 8 40.575 | 14.00 | 67.9 | 1.59319 |
| 9 188.007 | (d9) | | |
| 10 133.841 | 5.20 | 23.0 | 1.86074 |
| 11 −99.640 | 2.80 | 64.1 | 1.51680 |
| 12 86.754 | 6.50 | | |
| 13 122.462 | 3.30 | 45.9 | 1.54814 |
| 14 61.980 | (d14) | | |
| 15 264.265 | 7.00 | 53.7 | 1.69350 |
| 16 −58.429 | 1.00 | | |
| 17 −57.994 | 2.50 | 28.2 | 1.74000 |
| 18 294.241 | 4.20 | | |
| 19 156.674 | 2.00 | 35.5 | 1.59507 |
| 20 61.130 | 6.50 | 47.5 | 1.78797 |
| 21 301.397 | 3.00 | | |
| 22 ∞ | (Bf) | | |

| f =195.0000 | β =−0.1230 |
| D0 ∞ | 1761.1081 |
| d9 14.4358 | 29.0347 |
| d14 23.0099 | 8.4109 |
| Bf 64.7804 | 64.7804 |

There are listed in the following for Embodiment 5 a focal length of each lens group, an effective aperture φ of object-side lens surface of the positive lens element closest to the object in the first lens group $G_1$, a back focus $Bf_{11}$ of the front group $G_{11}$ in the first lens group $G_1$, and an air gap $D_1$ between the front group $G_{31}$ and the rear group $G_{32}$ in the third lens group.

$f_1=153.400$
$f_2=-59.000$
$f_3=75.000$
$f_{31}=228.789$
$\phi=97.500$
$Bf_{11}=154.506$
$D_1=37.732$ Next listed are values for the aforementioned conditions in Embodiment 5.

(1) $\phi/f_1=0.636$
(2) $D_1/Bf_{11}=0.244$
(3) $f_3/f_{31}=0.328$
(4) $q_{32}=0.316$
(5) $f_2/f_1=-0.385$ The image can be deflected either by making the third lens group $G_3$ offset from the optical axis or by making either the front group $G_{31}$ or the rear group $G_{32}$ in the third lens group offset from the optical axis.

What is claimed is:

1. A high-aperture-ratio inner-focus telephoto lens comprising a first lens group of positive refracting power, a second lens group of negative refracting power and a third lens group of positive refracting power arranged in the named order from the object side;

wherein said first lens group and said second lens group form a substantially afocal system;

wherein focusing is effected by moving said second lens group along the optical axis;

wherein said first lens group has a front group of positive refracting power and a rear group of weak positive refracting power arranged in the named order from the object side;

wherein said third lens group comprises a front group of weak positive refracting power and a rear group of positive refracting power arranged in the named order from the object side; and wherein the following conditions are satisfied:

$0.60 < \Phi/f_1 < 0.77$ $0.10 < D_1/Bf_{11} < 0.26$ where Φ is an effective diameter of an object-side lens surface of a positive lens element closest to an object in said first lens group, $f_1$ is a focal length of said first lens group, $Bf_{11}$ is a back focus of said front group in said first lens group and $D_1$ is an air gap between said front group and said rear group in said first lens group.

2. A high-aperture-ratio inner-focus telephoto lens according to claim 1, wherein the following condition is satisfied:

$0.10 < f_3/f_{31} < 0.35$ where $f_3$ is a focal length of said third lens group and $f_{31}$ is a focal length of said front group in said third lens group.

3. A high-aperture-ratio inner-focus telephoto lens according to claim 1, wherein said front group in said third lens group comprises at least one positive lens element and a negative lens element.

4. A high-aperture-ratio inner-focus telephoto lens according to claim 1, wherein said rear group in said third lens group comprises a positive lens element, or a positive lens element and a negative lens element.

5. A high-aperture-ratio inner-focus telephoto lens according to claim 1, wherein said rear group in said third lens group is arranged to satisfy the following condition:

$-0.17 < q_{32} < 0.35$ where $q_{32}$ is a dimensional factor of said rear group in said third lens group and $q_{32}=(R_2+R_1)/(R_2-R_1)$ where $R_1$: a radius of curvature of a surface closest to an object in said rear group in said third lens group;

$R_2$: a radius of curvature of a surface closest to an image in said rear group in said third lens group.

6. A high-aperture-ratio inner-focus telephoto lens according to claim 1, wherein said rear group in said third lens group is arranged movable across the optical axis to deflect an image thereby.

7. A high-aperture-ratio inner-focus telephoto lens according to claim 1, wherein said front group in said third lens group is arranged movable across the optical axis to deflect an image thereby.

8. A high-aperture-ratio inner-focus telephoto lens according to claim 1, wherein the following condition is satisfied:

$-0.47 < f_2/f_1 < -0.37$ where $f_1$ is a focal length of said first lens group and $f_2$ is a focal length of said second lens group.

9. A high-aperture-ratio inner-focus telephoto lens according to claim 1, wherein said rear group in said first lens group has a negative lens element of meniscus form with a convex surface on the object side and a positive lens element of meniscus form with a convex surface on the object side arranged in the named order from the object side.

10. A high-aperture-ratio inner-focus telephoto lens according to claim 1, wherein an aperture stop is provided in an optical path between said second lens group $G_2$ and said third lens group.

11. A high-aperture-ratio inner-focus telephoto lens according to claim 1, wherein a stationary stop is provided in an optical path on the image side of said third lens group.

12. A high-aperture-ratio inner-focus telephoto lens according to claim 1, wherein said third lens group is arranged movable across the optical axis to deflect the image thereby.

13. A high-aperture-ratio inner-focus telephoto lens comprising a first lens group of positive refracting power, a second lens group of negative refracting power and a third lens group of positive refracting power arranged in the named order from the object side;

wherein said first lens group and said second lens group form a substantially afocal system;

wherein focusing is effected by moving said second lens group along the optical axis;

wherein said first lens group has a front group of positive refracting power and a rear group of weak positive refracting power arranged in the named order from the object side; and wherein said third lens group is arranged movable across the optical axis to deflect the image thereby.

* * * * *